United States Patent
Wu et al.

(10) Patent No.: US 8,473,373 B2
(45) Date of Patent: Jun. 25, 2013

(54) FEEDBACK CONTROL THEORETIC PARTS INVENTORY MANAGEMENT MODEL

(75) Inventors: Peiling Wu, Sterling Heights, MI (US); Jeffrey Tew, Rochester, MI (US); Stephan R. Biller, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2215 days.

(21) Appl. No.: 11/341,545

(22) Filed: Jan. 27, 2006

(65) Prior Publication Data
US 2007/0192213 A1    Aug. 16, 2007

(51) Int. Cl.
*G06Q 10/00*     (2012.01)

(52) U.S. Cl.
USPC .......................................................... 705/28

(58) Field of Classification Search
USPC ................................................ 705/28, 22, 10
See application file for complete search history.

(56) References Cited

U.S. PATENT DOCUMENTS

| | | | | |
|---|---|---|---|---|
| 6,920,427 B2* | 7/2005 | Anthony et al. | ................... | 705/8 |
| 7,292,904 B2* | 11/2007 | Denton et al. | ................ | 700/100 |
| 2002/0103709 A1* | 8/2002 | Anthony et al. | ................ | 705/22 |
| 2002/0165804 A1* | 11/2002 | Beebe et al. | ..................... | 705/28 |
| 2002/0188499 A1* | 12/2002 | Jenkins et al. | .................. | 705/10 |
| 2003/0083947 A1* | 5/2003 | Hoffman et al. | ................ | 705/22 |
| 2003/0216952 A1* | 11/2003 | Klett et al. | ........................ | 705/8 |
| 2008/0040183 A1* | 2/2008 | Birjandi et al. | .................... | 705/8 |
| 2008/0046309 A1* | 2/2008 | Birjandi et al. | ................. | 705/10 |
| 2008/0147490 A1* | 6/2008 | Najmi et al. | .................... | 705/10 |

* cited by examiner

*Primary Examiner* — Seye Iwarere
(74) *Attorney, Agent, or Firm* — John A. Miller; Miller IP Group, PLC

(57) ABSTRACT

A system and method for calibrating an inventory planning model in a parts supply chain. The inventory planning model is determined based on certain input. A performance monitor measures the parts supply chain and provides performance metrics. The movement of parts through the parts supply chain is also monitored by a supply chain visibility system that keeps track of actual supply chain conditions. Both information on the actual supply chain conditions and the performance metrics is sent to a feedback filter that formats the information into an appropriate form. The feedback from the feedback filter is sent to a feedback controller. Based on the feedback information and the input, the feedback controller adjusts the input of the inventory planning model while determining how frequently the inventory planning model is calibrated and how the inventory planning model is calibrated.

17 Claims, 2 Drawing Sheets

US 8,473,373 B2

FEEDBACK CONTROL THEORETIC PARTS INVENTORY MANAGEMENT MODEL

BACKGROUND OF THE INVENTION

1. Field of the Invention

This invention relates generally to a system and method for providing inventory planning for a service parts supply chain, where inventory polices are established based on multi-echelon inventory planning optimization while using a performance monitor for measuring the performance of the supply chain, a supply chain visibility system for monitoring actual conditions of the supply chain and a feedback controller for adjusting the input of the inventory planning and recalibrate it based on the actual performance and conditions of the supply chain.

2. Discussion of the Related Art

OEMs (original equipment manufacturers) typically provide an after market parts supply to provide service vehicle parts for their vehicles. The service parts are ordered by and delivered to a dealer or a service shop that provides the parts to customers who wish their vehicles to be serviced. These parts typically follow a supply chain from the parts manufacturer to the vehicle owner.

FIG. 1 shows a typical after market parts supply chain (PSC) 10 to provide after market service parts. The PSC 10 includes a supplier network 12 where suppliers manufacture or distribute the parts. The parts are warehoused in parts distribution centers (PDC) 14, including parts processing centers (PPC), that are typically owned by the OEM for the vehicles it manufactures. The PDC/PPC 14 typically is in the multi-echelon structure and provides parts to a certain portion of the market. A plurality of dealers or other automotive shops would be part of a dealer network 16 that would order parts from the PDC/PPC 14. The dealer or vehicle shop in the network 16 would provide the parts and the vehicle service to customers 18 that own the vehicles.

It is critical for the OEM to provide the right quantity of the right parts at the right place at the right time to ensure customer satisfaction and loyalty. To accomplish these tasks, the OEM will employ an inventory planning model to effectively manage the inventory at PDC/PPC 14. The inventory planning model determines optimum inventory policy parameters based on predetermined inputs, such as order forecasts for dealers and end customers, nominal transit times, processing times, handling times, etc., for stocking the parts at the PDC/PPC 14. Depending on various inventory policies, inventory policy parameters include safety stock level, minimum and maximum inventory levels, inventory re-order points, order-up-to inventory level, etc.

Known inventory planning policies typically determine the optimal inventory policy parameters for the multi-echelon PSC 10 on a monthly basis based on the inputs. Further, known inventory planning models are typically executed into the operational level of the PSC 10 without a real visibility of the PSC 10, particularly, the actual supply chain conditions, such as inventory levels at the PDC/PPC 14 and the dealers, demand for the dealers and customers, transit time from one location to another in the PSC 10, etc. However, it is very important to be able to track the actual condition as it often changes as a result of supply chain uncertainties, such as customer needs, parts usage life, transportation conditions, weather, etc. Moreover, the actual effectiveness of the PSC 10 is not explicitly monitored to measure the goodness of inventory planning. Therefore, improvements can be made in the inventory planning model to help better manage the parts supply chain and insure customer satisfaction and loyalty.

SUMMARY OF THE INVENTION

In accordance with the teachings of the present invention, a system and method for calibrating an inventory planning model used in a parts supply chain is disclosed. The inventory planning model determines the inventory policy parameters for parts inventory at a PDC/PPC based on certain inputs, such as order forecasts, transit times, processing/handling times, etc. The parts supply chain goes through the process of using parts to satisfy customer needs. A performance monitor measures the performance of the parts supply chain and provides performance metrics. The movement of parts through the parts supply chain is also monitored by a supply chain visibility system that keeps track of actual supply chain conditions. The information of both the actual supply chain conditions and the performance metrics is sent to a feedback filter that formats the information into an appropriate form. The filtered feedback is then sent to a feedback controller. Along with the predetermined input, the feedback controller determines how the input of the inventory planning model is adjusted, as well as how frequently the input is adjusted.

Additional features of the present invention will become apparent from the following description and appended claims, taken in conjunction with the accompanying drawings.

DETAILED DESCRIPTION OF THE EMBODIMENTS

The following discussion of the embodiments of the invention for a feedback control based inventory planning model of a parts supply chain is merely exemplary in nature, and is in no way intended to limit the invention or its applications or uses.

As will be discussed in detail below, the present invention provides a feedback control based inventory planning model for an after market parts supply chain for service parts. The model leverages an existing supply chain visibility system to monitor actual supply chain conditions, tracks pre-specified performance metrics, and provides the appropriately filtered information to a feedback controller to effectively recalibrate the inventory targets.

Figure 1:
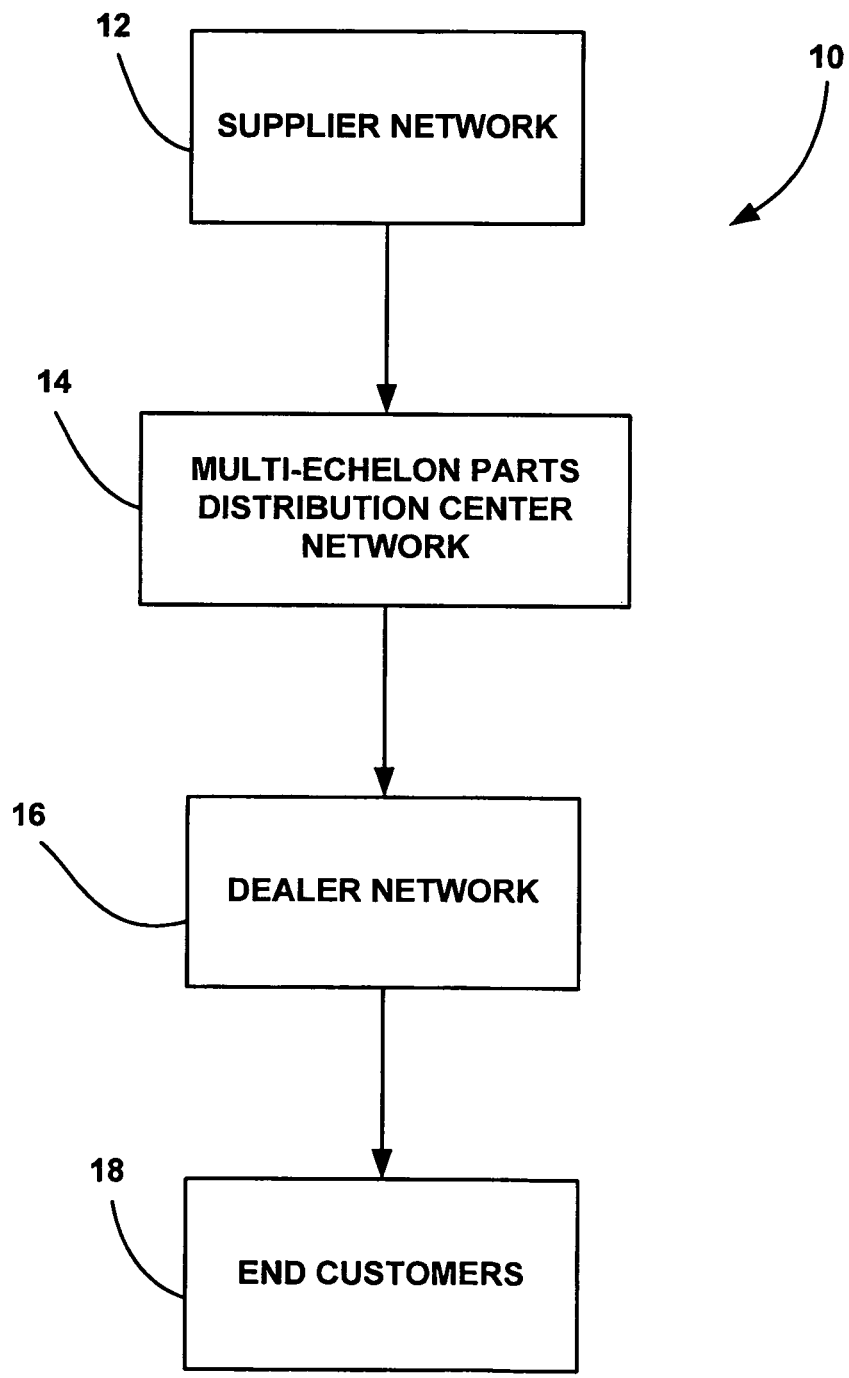
FIG. 1 is a block diagram of a known vehicle parts supply chain.
Figure 2:
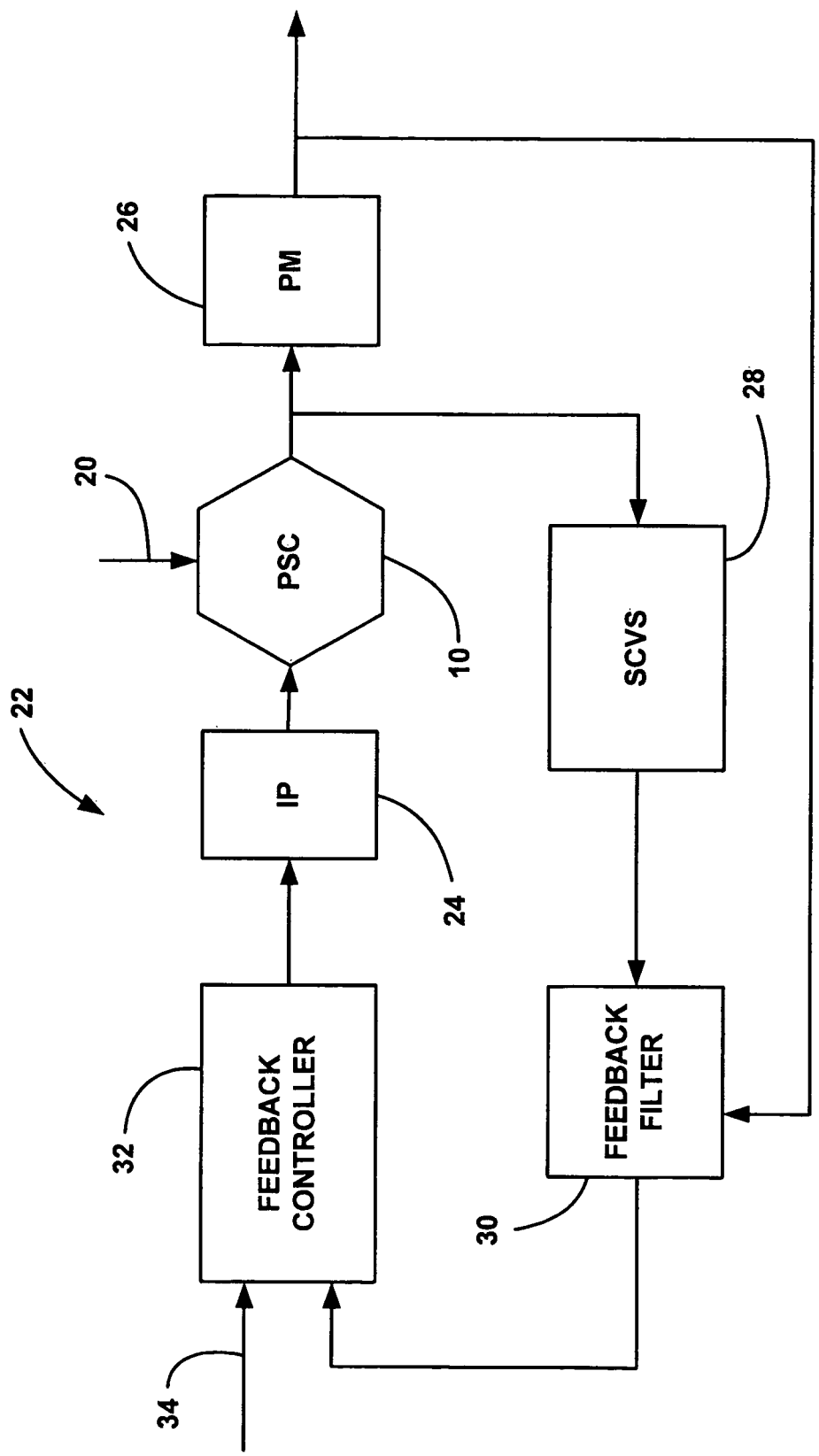
FIG. 2 is a block diagram of a system for feedback control based on an inventory planning model for the parts supply chain shown in FIG. 1.

FIG. 2 is a block diagram of a system 22 for providing feedback control to an inventory planning (IP) model 24, according to an embodiment of the present invention. As discussed above, the IP model 24 determines optimum inventory policy parameters based on predetermined inputs provided on line 34 to provide the desirable level of parts inventory. The inputs include order forecasts for dealers and end customers, nominal transit times, processing times, handling times, etc. The IP model 24 provides the inventory policy parameters, also discussed above, to the PSC 10 to control the inventory of parts through the PSC 10. An input line 20 to the PSC 10 identifies the supply chain uncertainties inputs discussed above. The IP model 24 can be any multi-echelon inventory optimization model in the literature and practice.

Various aspects of the PSC 10 can be monitored to give a quantified depiction of the flow of parts through the PSC 10.

According to the invention, the system 22 includes a performance monitor (PM) 26 that receives predetermined variables from the PSC 10 to determine its performance by measuring predetermined performance metrics. In one embodiment, the performance metrics include off the shelf parts availability at the PDC/PPC 14 and the dealers, the number of stock that is out, inventory turnover, expedited freight costs, generated revenue, etc. The PM 26 can be any suitable algorithm or other automated process that receives the variables from the PSC 10, and uses that information to provide an output of the performance of the PSC 10 based on the predetermined performance metrics.

The PSC variables from the PSC 10 are also provided to a supply chain visibility system (SCVS) 28. The SCVS 28 keeps track of the actual supply chain conditions, such as inventory levels at the PDC/PPC 14 and the dealers, demand from the dealers and the end customers 18, transit time from the supplier 12 to the PDC/PPC 14 or from the PDC/PPC 14 to the dealer 16, etc. Further, the SCVS 28 keeps track of whether orders have been shipped, whether they have been received, any delays, etc. Various types of supply chain visibility systems are known in the art that can be used for this purpose.

The actual supply chain conditions from the SCVS 28 and the performance metrics from the PM 26 are sent to a feedback filter processor 30. The feedback filter processor 30 takes the performance metrics and actual conditions of the PCS 10 and puts the information into a desired format. For example, because some information, such as specific part shipments received by the feedback filter processor 30, is updated every hours, the feedback filter processor 30 may aggregate the raw information into a daily or weekly basis. Further, because various supply chain visibility systems can be used within the system 22, the feedback filter processor 30 can put the information from the SCVS 28 into the proper format. The feedback filter processor 30 can also be any suitable algorithm or other automated process that is designed to take the input discussed above and provide a quantified output of the operation of the PSC 10.

The properly filtered information on supply chain conditions and performance metrics from the feedback filter processor 30 is then sent to a feedback controller 32 that also receives the inputs on the line 34. The feedback controller 32 determines how the input of the IP model 24 is adjusted, as well as how frequently the input is adjusted based on the filtered feedback information and the predetermined inputs. The feedback controller 32 can employ any model from feedback control theory suitable for the purposes described herein. The feedback controller 32 can include certain software that has been programmed that takes the input of the filtered feedback to adjust the input of the IP model 24 to set the inventory policy parameters. As the system 22 cycles and the filtered feedback is provided to the feedback controller 32, the performance of the PSC 10 should stay around the desired performance target. A threshold value can be specified so that recalibration can be guided to effectively respond to an exceptional alert without causing unnecessary system nervousness and noise.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for managing parts inventory based on feedback control theory for a parts supply chain, said parts supply chain being influenced by supply chain uncertainties, said method comprising:
    applying an inventory planning model to determine optimal inventory policy parameters based on predetermined inputs;
    monitoring performance of the parts supply chain by measuring predetermined performance metrics;
    monitoring actual supply chain conditions of the parts supply chain;
    filtering information from the performance metrics and the actual supply chain conditions into an appropriate format; and
    using feedback control to recalibrate the inventory planning model based on the predetermined inputs and the filtered performance metrics and the actual supply chain conditions, wherein using feedback control to recalibrate the inventory planning model includes determining how the input of the inventory planning model is adjusted and how frequently the input is adjusted.

2. The method according to claim 1 wherein monitoring performance of the parts supply chain by measuring predetermined performance metrics includes measuring off the shelf parts availability at a parts distribution center and dealers, the number of stock that is out, inventory turnover, expedited freight costs, and generated revenue.

3. The method according to claim 1 wherein monitoring actual supply chain conditions of the parts supply chain includes monitoring inventory levels at a parts distribution center and dealers, demand from the dealers and end customers, transit time from a supplier to the parts distribution center or from the parts distribution to the dealer, whether orders have been shipped, whether orders have been received and any delays.

4. The method according to claim 1 wherein filtering the information on the performance metrics and the actual supply chain conditions includes putting the performance metrics and the actual supply chain conditions in a certain format.

5. The method according to claim 1 wherein filtering the information on the performance metrics and the actual supply chain conditions includes aggregating performance parameters and conditions to provide a more general value of the performance and conditions.

6. The method according to claim 1 wherein the predetermined inputs include order forecasts for dealers and end customers, nominal transit times and processing and handling times.

7. The method according to claim 1 wherein the parts supply chain includes a supplier network, a parts distribution center, a dealer network and customers, wherein the supplier network supplies parts to the parts distribution center, the parts distribution center delivers parts to the dealer network and the dealer network supply parts to the customers.

8. The method according to claim 1 wherein the parts supply chain is a vehicle parts supply chain.

9. A system for managing parts inventory based on feedback control theory for a parts supply chain, said parts supply chain being influenced by supply chain uncertainties, said system comprising:
    an inventory planning model that determines optimal inventory policy parameters for the parts supply chain based on predetermined inputs;
    a performance monitor that monitors the performance of the parts supply chain by measuring predetermined performance metrics;

a supply chain visibility sub-system that monitors actual supply chain conditions of the parts supply chain; and a feedback controller responsive to the performance metrics, the actual supply chain conditions and the predetermined inputs, said feedback controller calibrating the inventory planning model based on the predetermined inputs, the performance metrics and the actual supply chain conditions, wherein the feedback controller determines how the input of the inventory planning model is adjusted and how frequently the input is adjusted.

10. The system according to claim 9 further comprising a feedback filter processor that is responsive to the performance metrics from the performance monitor and the actual supply chain conditions from the supply chain visibility sub-system, said feedback filter processor filtering the information on the performance metrics and the actual supply chain conditions, said feedback controller calibrating the inventory planning model based on the filtered performance metrics and the filtered actual supply chain conditions.

11. The system according to claim 10 wherein the feedback filter processor puts the information on the performance metrics and actual supply chain conditions in a certain format.

12. The system according to claim 10 wherein the feedback filter processor aggregates performance parameters and conditions to provide a more general value of the performance.

13. The system according to claim 9 wherein the performance monitor measures off the shelf parts availability at a parts distribution center and dealers, the number of stock that is out, inventory turnover, expedited freight costs, and generated revenue.

14. The system according to claim 9 wherein the supply chain visibility sub-system monitors inventory levels at a parts distribution center and dealers, demand from the dealers and end customers, transit time in the parts distribution center, whether orders have been shipped, whether orders have been received and any delays.

15. The system according to claim 9 wherein the predetermined inputs include order forecasts for dealers and end customers, nominal transit times and processing and handling times.

16. The system according to claim 9 wherein the parts supply chain includes a supplier network, a parts distribution center, a dealer network and customers, wherein the supplier network supplies parts to the parts distribution center, the parts distribution center delivers parts to the dealer network and the dealer network supplies parts to the customers.

17. The system according to claim 9 wherein the parts supply chain is a vehicle parts supply chain.

* * * * *